United States Patent
Deng et al.

(10) Patent No.: US 6,765,619 B1
(45) Date of Patent: Jul. 20, 2004

(54) METHOD AND APPARATUS FOR OPTIMIZING EXPOSURE TIME IN IMAGE ACQUISITIONS

(75) Inventors: Zhonghan Deng, Albany, CA (US); David Xiao Dong Yang, Mountain View, CA (US); Xi Peng, Milpitas, CA (US); Odutola Oluseye Ewedemi, San Jose, CA (US); Ricardo Jansson Motta, Palo Alto, CA (US); Yi-Hen Wei, San Jose, CA (US)

(73) Assignee: PIXIM, Inc., Mountain View, CA (US)

( * ) Notice: Subject to any disclaimer, the term of this patent is extended or adjusted under 35 U.S.C. 154(b) by 0 days.

(21) Appl. No.: 09/542,196

(22) Filed: Apr. 4, 2000

(51) Int. Cl.$^7$ .......................... H04N 5/235; H04N 5/335
(52) U.S. Cl. ........................................ 348/362; 348/297
(58) Field of Search ............................ 348/362, 229.1, 348/230.1, 296, 297, 298, 312; 250/208.1

(56) References Cited

U.S. PATENT DOCUMENTS

| | | | |
|---|---|---|---|
| 4,471,228 A | | 9/1984 | Nishizawa et al. |
| 4,996,413 A | * | 2/1991 | McDaniel et al. ....... 250/208.1 |
| 5,264,940 A | | 11/1993 | Komiya et al. |
| 5,461,425 A | * | 10/1995 | Fowler et al. ............... 348/294 |
| 5,801,657 A | | 9/1998 | Fowler et al. |
| 5,892,541 A | * | 4/1999 | Merrill ........................ 348/302 |
| 5,917,544 A | | 6/1999 | Sobotta et al. |
| 6,366,680 B1 | * | 4/2002 | Brunk et al. ................. 382/100 |
| 6,369,737 B1 | * | 4/2002 | Yang et al. .................. 341/155 |
| 6,452,633 B1 | * | 9/2002 | Merrill et al. ............... 348/302 |
| 6,529,241 B1 | * | 3/2003 | Clark .......................... 348/308 |
| 6,606,121 B1 | * | 8/2003 | Bohm et al. ................. 348/297 |
| 6,665,010 B1 | * | 12/2003 | Morris et al. ................ 348/297 |

* cited by examiner

Primary Examiner—Ngoc-Yen Vu
Assistant Examiner—Timothy J. Henn
(74) Attorney, Agent, or Firm—Lumen Intellectual Property Services, Inc.

(57) ABSTRACT

A method of optimizing the exposure times of regions of pixels of an image sensor array during exposure is accomplished by utilizing time interval sampling of an image sensor array comprising of pixels configured to generate digital image signals. Luminance values are extracted from each digital image signal and analyzed to determine if a pixel has reached the optimal exposure. If a pixel has reached the optimal exposure, subsequent digital image signals from this pixel will not be recorded. This preserves the recording of the optimal digital image signal generated by the pixel at the time when the pixel reached its optimal exposure. This process of selectively terminating the recording of digital image signals based on optimal exposures of the pixels can be performed on individual pixels or can be performed on a region of pixels.

20 Claims, 7 Drawing Sheets

METHOD AND APPARATUS FOR OPTIMIZING EXPOSURE TIME IN IMAGE ACQUISITIONS

BACKGROUND OF THE INVENTION

1. Field of the Invention

The present invention relates to image sensors for converting an optical image into electrical signals and particularly to a method and apparatus for optimizing exposure time in image acquisitions.

2. Description of the Related Art

An image sensor is used to convert an optical image focused on the sensor into electrical signals. The image sensor typically includes an array of photodetectors, where each photodetector produces a signal corresponding to the intensity of light impinging upon that photodetector when an image is focused on the array. These signals may then be used, for example, to display a corresponding image on a monitor or otherwise used to provide information about the optical image.

One very common type of image sensor is a charge coupled device (CCD). Integrated circuit chips containing a CCD image sensor have a relatively low yield and are expensive due to the specialized processing involved. The CCDs also consume a relatively large amount of power. Other well known disadvantages exist.

A much less expensive type of image sensor is formed as an integrated circuit using a complementary metal-oxide semiconductor (CMOS) process. In such a CMOS type image sensor, a photodiode or phototransistor (or other suitable device) is used as the light detecting element, where the conductivity of the element corresponds to the intensity of light impinging upon the element. The variable signal thus generated by the light detecting element is an analog signal whose magnitude is approximately proportional (within a certain range) to the amount of light impinging on the element.

It is known to form these light detecting elements in a two dimensional core array which is addressable by row and column. Once a row of elements has been addressed, the analog signals from each of the light detecting elements in the row are coupled to the respective columns in the array. An analog-to-digital (A/D) converter may then be used to convert the analog signals on the columns to digital signals so as to provide only digital signals at the output of the image sensor chip.

Present technologies only address the speed and the reduction in size of the image sensor array. U.S. Pat. No. 5,461,425 to Fowler et al. discloses the use of pixel level A/D converters to speed up the conversion of the optical image into digital data streams. U.S. Pat. No. 5,801,657 to Fowler et al. discloses a method for simultaneously performing bit serial analog to digital conversion which also speeds up the conversion of an optical image into digital data streams. However, none of the present technologies have addressed the issue of photodetectors reaching saturation in certain areas of the image sensor array before the rest of the photodetectors in the image sensor array do. This causes problems with over or under exposure of the image sensor array.

A need therefore exists for providing a method and an apparatus to optimize the exposure times of regions of pixels in an image sensor array during the exposure.

Objectives and Advantages

One of the objectives of the present invention is to provide a method of optimizing the exposure times of regions of pixels of an image sensor array during the exposure. This is in contrast with present technology that requires 2 exposures in order to optimally capture 1 image. The first exposure is to determine the optimal exposure parameters and the second exposure is to actually capture the image using the optimal settings.

SUMMARY OF INVENTION

In view of the foregoing objectives, a method of the present invention utilizes time interval sampling to optimize the exposure of an image acquisition system. The digital signals generated by pixels in an image sensor array are passed through a color separator in order to extract luminance values for each pixel. These luminance values are statistically analyzed in order to determine the saturation levels of each pixel. A pixel in this invention comprises of a photodetector and analog-to-digital conversion circuitry. Because digital signals, as opposed to analog signals, are generated by the pixels, the read out of the digital signals from the image sensor array can be performed very quickly. This enables the present method of multiple time interval sampling during one exposure period.

During an exposure period, the image sensor array is sampled at multiple time intervals, to determine the saturation levels of each pixel. Once a pixel is determined to have reached an optimal saturation ceiling, the subsequent digital image signals from this pixel are not recorded. This preserves the optimal digital image signal that is generated by the pixel at the time when the pixel has reached the saturation ceiling.

This process of selectively terminating the recording of digital image signals based on saturation levels of the pixels can be performed on individual pixels or can be performed on a region of pixels.

BRIEF DESCRIPTION OF THE DRAWINGS

The foregoing and other objects, features and advantages of the present invention will be apparent from the following detailed description of the preferred embodiments of the invention, reference being made to the accompanying drawings in which like reference numerals indicate like parts and in which.

DETAILED DESCRIPTION OF THE EMBODIMENTS

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
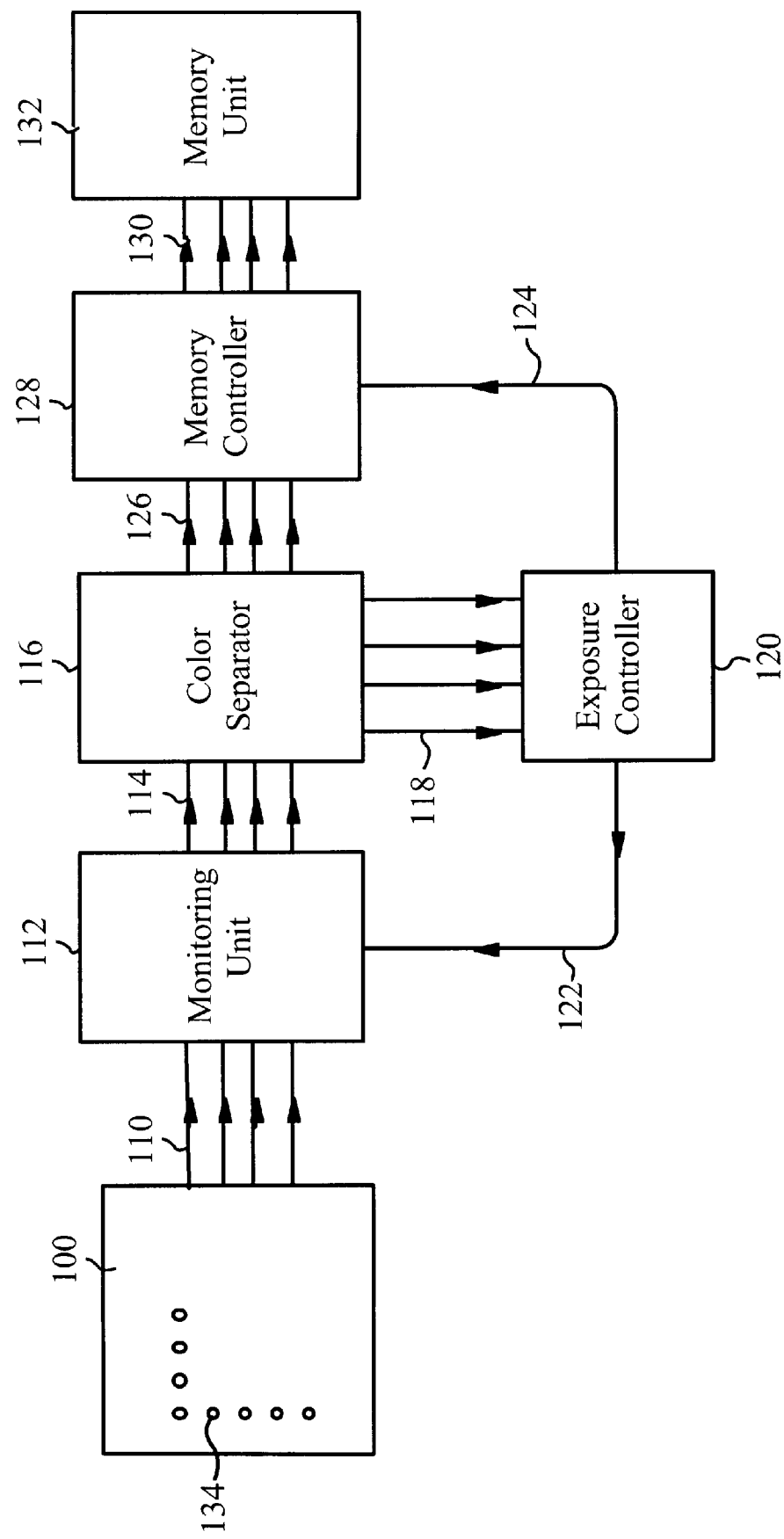
FIG. 1 is a block diagram illustrating an embodiment of the present invention.

FIG. 1 shows an embodiment of the present invention. An image sensor array 100 comprises thousands of pixels 134, which can be arranged in a 2-dimensional array of rows and columns.

Each pixel comprises a photodetector and an analog-to-digital converter (ADC). The photodetectors can be any device with a conductivity that is proportional to the light intensity that is impinging upon it. Examples of such devices are charge coupled device (CCD) and CMOS phototransistors. The analog current that is flowing through a phototransistor or photogate is proportional to the intensity of light that is impinging upon its base.

Based on the CMOS architecture disclosed in U.S. Pat. No. 5,461,425 to Fowler et al. and U.S. Pat. No. 5,801,657 to Fowler et al., a circuit performing analog-to-digital conversion is connected to the output of each photodetector to convert the analog signal, which represents the intensity of light impinging upon the photodetector, to a digital signal equivalent that can be processed by a digital signal processor (DSP) or stored in memory for later calculations.

One of the problems associated with CMOS image sensors as opposed to CCD image sensors is their lower dynamic range, i.e. CMOS-based photodetectors tend to become saturated very quickly, leading to overexposures in some areas of the image sensor. If the exposure time is shortened to adjust for this overexposure, some lower light intensity areas may be underexposed. This problem is solved by the present invention if signals from a photodetector, or a region of photodetectors, are stored into memory when the photodetector first reaches a preset saturation ceiling, while the rest of the photodetectors that have not reached the preset saturation ceiling continues to be exposed and their signals are read into the memory at a later time. This will ensure that high light intensity areas are not overexposed, as signals are stored early before the photodetectors have reached saturation, and low light intensity areas are exposed for a longer period time until there is sufficient saturation of the photodetector before the signal is stored into memory.

The image sensor array 100 is connected to a monitoring unit 112. The purpose of the monitoring unit is to periodically take digital image signal readings of the photodetectors via at signals 110 and send the readings via signals 114 to the color separator 116. The color separator applies a filtering scheme, such as RGB or LUV, to the photodetector digital readings to extract a luminance value for each photodetector, which indicates the saturation level of the photodetector.

This luminance value is then sent via signal 118 to the exposure controller 120. The digital image signals may also be sent to the memory controller 128 via signals 126 to be stored in the memory unit 132. The exposure controller 120 performs two analyses on the luminance value. First, it determines if the photodetector has reached a preset saturation ceiling. The preset saturation ceiling is used to indicate that the photodetector is close to saturation. For instance, suppose the saturation value for a particular photodetector is 250 on an exemplary 8-bit luminance value scale and the preset saturation ceiling is set at 245 luminance value. When the photodetector has reached this preset saturation ceiling, the controller 120 will indicate via signal 124 to the memory controller 128 to stop writing subsequent digital image signals from this particular photodetector into the memory unit 132. The photodetector will continue to be exposed until the end of the exposure period. The photodetector will be exposed past its saturation point but this will have no impact on the final image that is generated by the image sensor array. The digital image signals generated by this photodetector beyond the preset saturation ceiling will not be written into the memory unit 132 so as to preserve the previously stored signal.

The second analysis the exposure controller 120 does on the luminance value is to determine how close each photodetector is to the preset saturation ceiling. For example, suppose the preset saturation ceiling is again set at 245 (for 8-bit precision) and further more, suppose the preset period in between sampling by the monitoring unit of the photodetectors is 100 ms. If a photodetector has a luminance value of 240 at the last sampling, it may well pass the 245 luminance value preset saturation ceiling and may even reach full saturation at the next sampling that will occur in 100 ms. Therefore, for photodetectors that are close to the preset saturation ceiling, it is necessary to reduce the time to the next sampling period. In the above example, the next sampling may need to be done 10 ms from the current sampling. The exposure controller 120 controls the monitoring unit 112 via signal 122 so that photodetectors that are close to the preset saturation ceiling are sampled at reduced sampling time intervals.

This above process continues until all the photodetectors have reached the preset saturation ceiling or until the preset exposure time period has expired. The data in the memory 132 can then be erased, or transferred to a permanent data storage media for further processing. The image sensor array is then ready for the next exposure.

Figure 2:
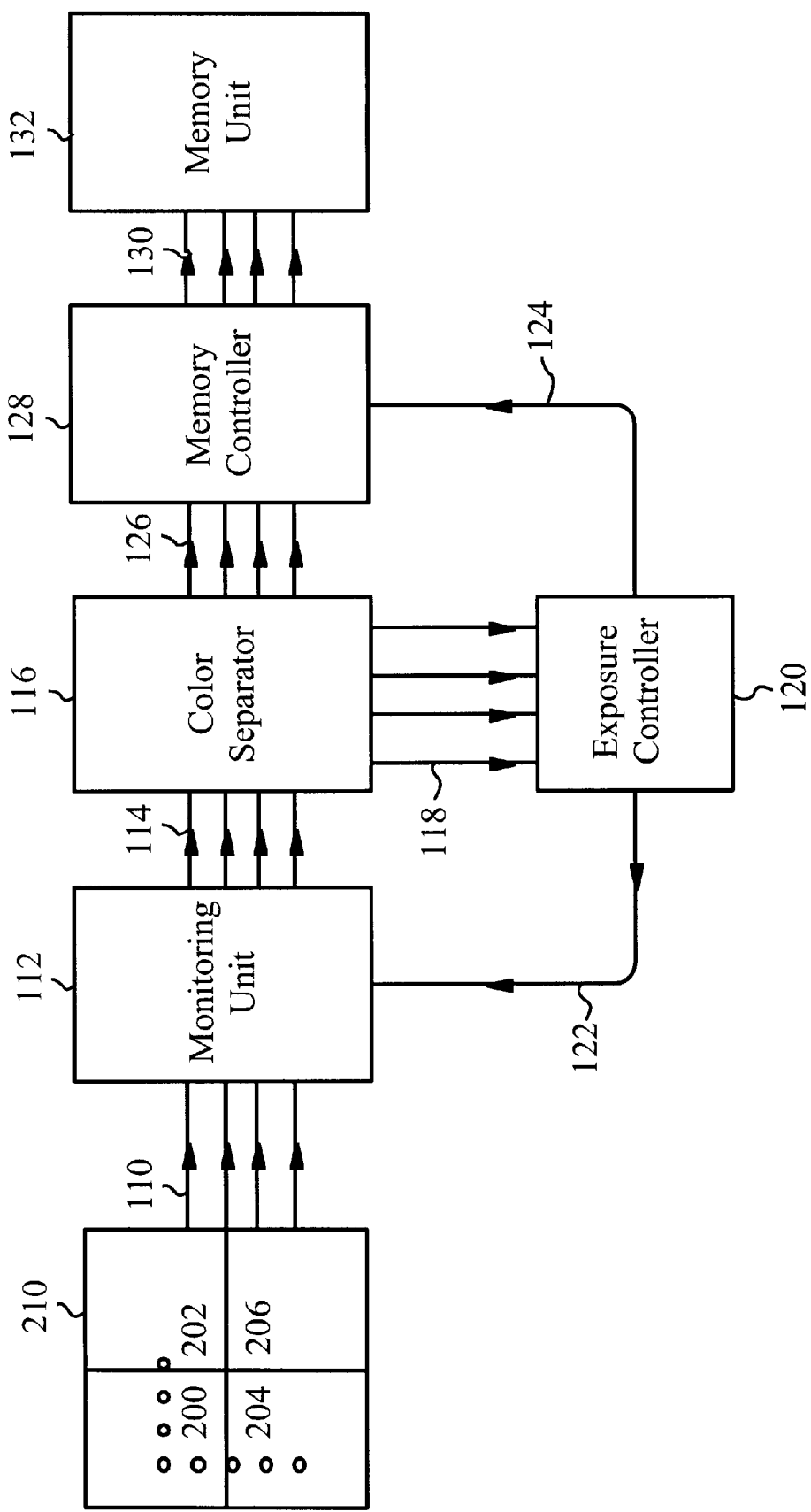
FIG. 2 is a block diagram illustrating an alternative embodiment of the present invention.

FIG. 2 illustrates a second embodiment of the present invention. In the embodiment shown in FIG. 1, each individual pixel (photodetector) is analyzed for its saturation level at each sampling period to determine if the preset saturation ceiling has been reached. Image sensor arrays with high resolution typically comprises a 2000 by 2000 or higher pixel array. The analysis of thousands of pixels individually can be quite burdensome on the exposure controller. Larger more powerful and more expensive exposure controllers are therefore required.

Alternatively, the image sensor array 210 can be divided into multiple regions such as 200, 202, 204, 206. These regions need not be the same size or shape. The photodetectors are still sampled and color separated individually by the monitoring unit 112 via signal 110 and by the color separator 116 via signal 114 respectively. However, the exposure controller 120 uses a statistical analysis to determine if a region of photodetectors has reached a preset saturation ceiling. If the exposure controller 120 determines that a region has reached the preset saturation ceiling, it will instruct the memory controller 128 to stop writing subsequent digital image signals from any of the photodetectors in that region into the memory unit 132.

Figure 5A:
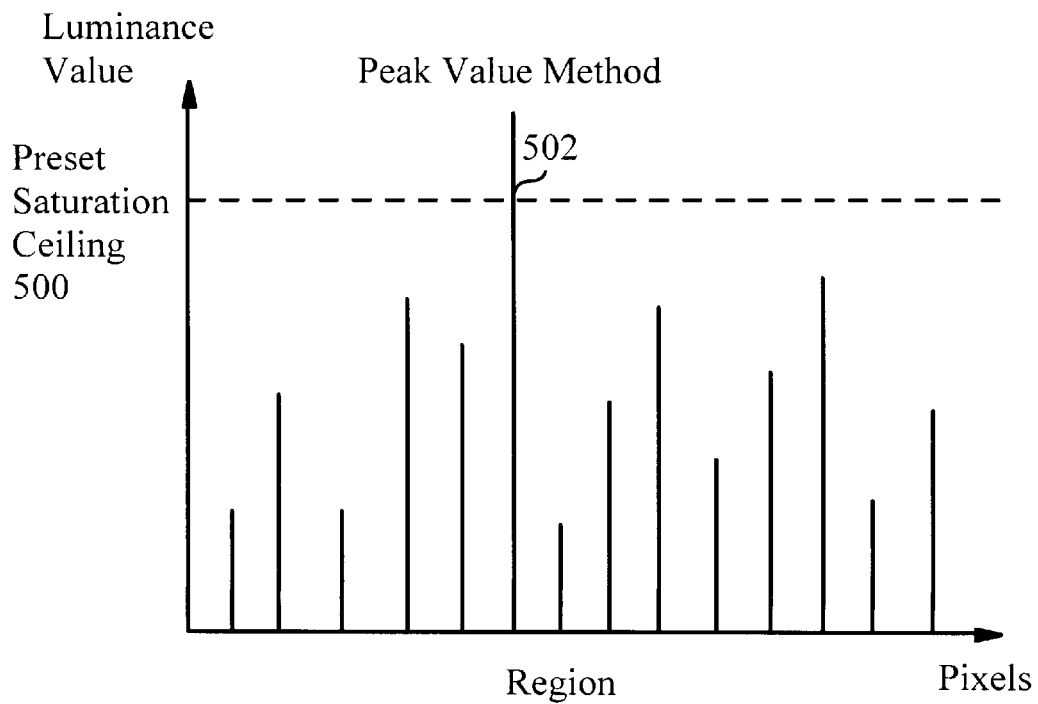
FIG. 5a is a graph illustrating the peak value statistical method of the present invention.
Figure 5B:
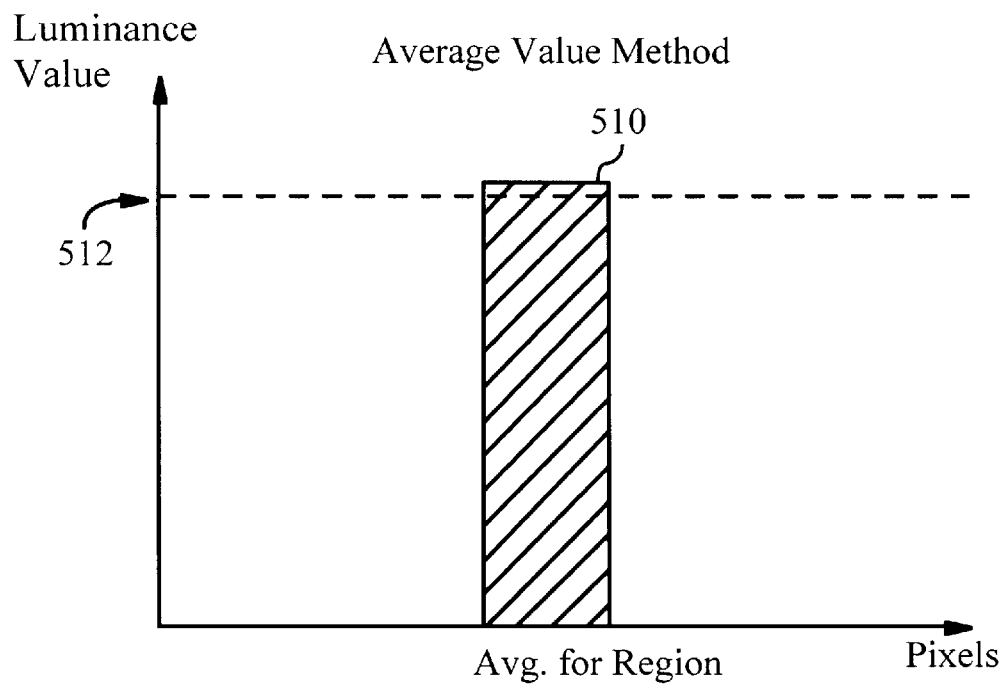
FIG. 5b is a graph illustrating the average value statistical method of the present invention.
Figure 5C:
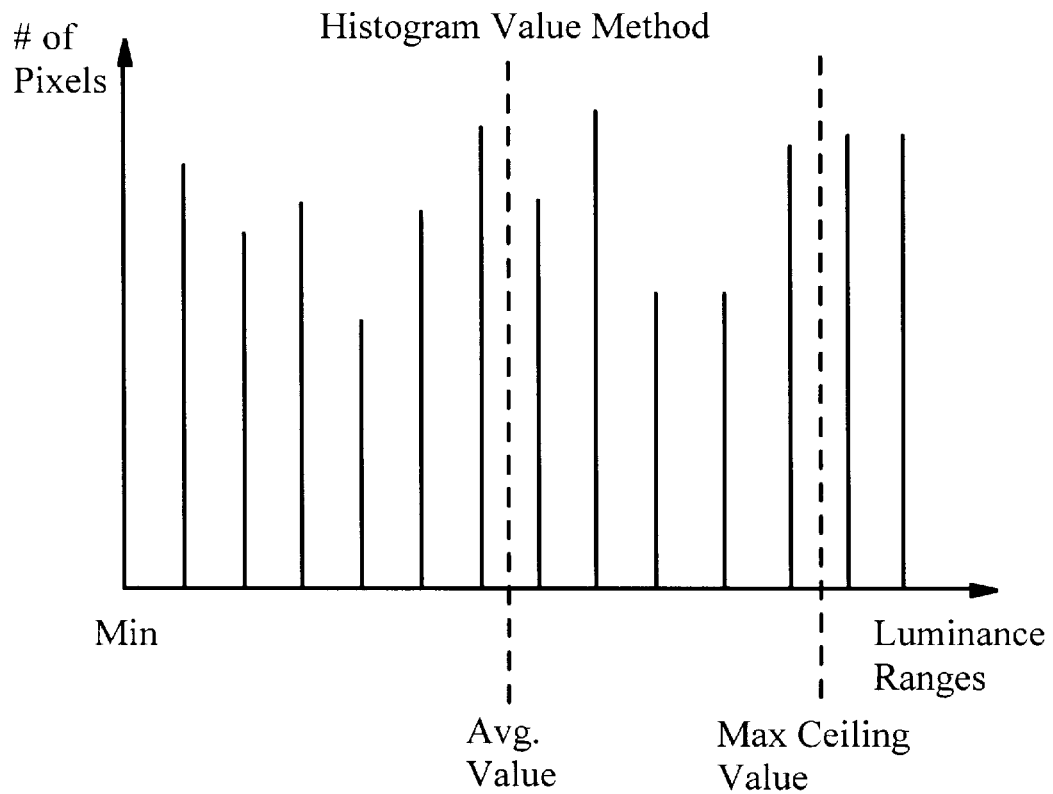
FIG. 5c is a graph illustrating the histogram method of the present invention.

FIGS. 5a–5c illustrates 3 statistical methods that can be used by the controller to determine if a region has reached the preset saturation ceiling. FIG. 5a illustrates the peak value method. Here, the exposure controller 120 is looking for at least one pixel 502 that has a saturation level that is equal to or higher than the preset saturation ceiling 500. When this condition occurs, the exposure controller 120 will instruct the memory controller 128 to stop writing subsequent digital image signals from this region of photodetectors into the memory unit 132.

FIG. 5b illustrates the average value method. The exposure controller 120 calculates the average luminance value 510 of all the photodetectors in one region. If this average luminance value is higher than an average value 512, the exposure controller 120 will instruct the memory controller 128 to stop writing subsequent digital image signals from this region of photodetectors into the memory unit 132. In operation, the average value may be a half of the saturated value. The saturated value is 256 in 8-bit precision. For example, the average value can be 128 in 8-bit precision or 512 in 10-bit precision. Alternatively, the average value may be obtained from a histogram method.

FIG. 5c illustrates the histogram method. A histogram is generated by the exposure controller 120 to determine how pixel values are distributed across an entire image. From the histogram, an average value or a saturation ceiling can be dynamically obtained according to statistic calculations which are known to those skilled in the art. Besides the histogram method, other statistical methods may be used as well to determine the average value and the ceiling value.

It may be noticed that each of these statistical methods if used alone may not produce the best statistical results and therefore the best image exposure. For instance, with the peak value method, a very focused bright spot in a region may force a few pixels to reach the preset saturation ceiling very quickly while the rest of the pixels in the region are underexposed or not be exposed at all. However, if an average luminance value for the region was also calculated, it may become obvious that a bright spot exists and an adjustment in the exposure time made to compensate. An ordinary person skilled in this art may be able to determine the best combination of statistical methods to obtain the most reliable statistical method.

Figure 6:
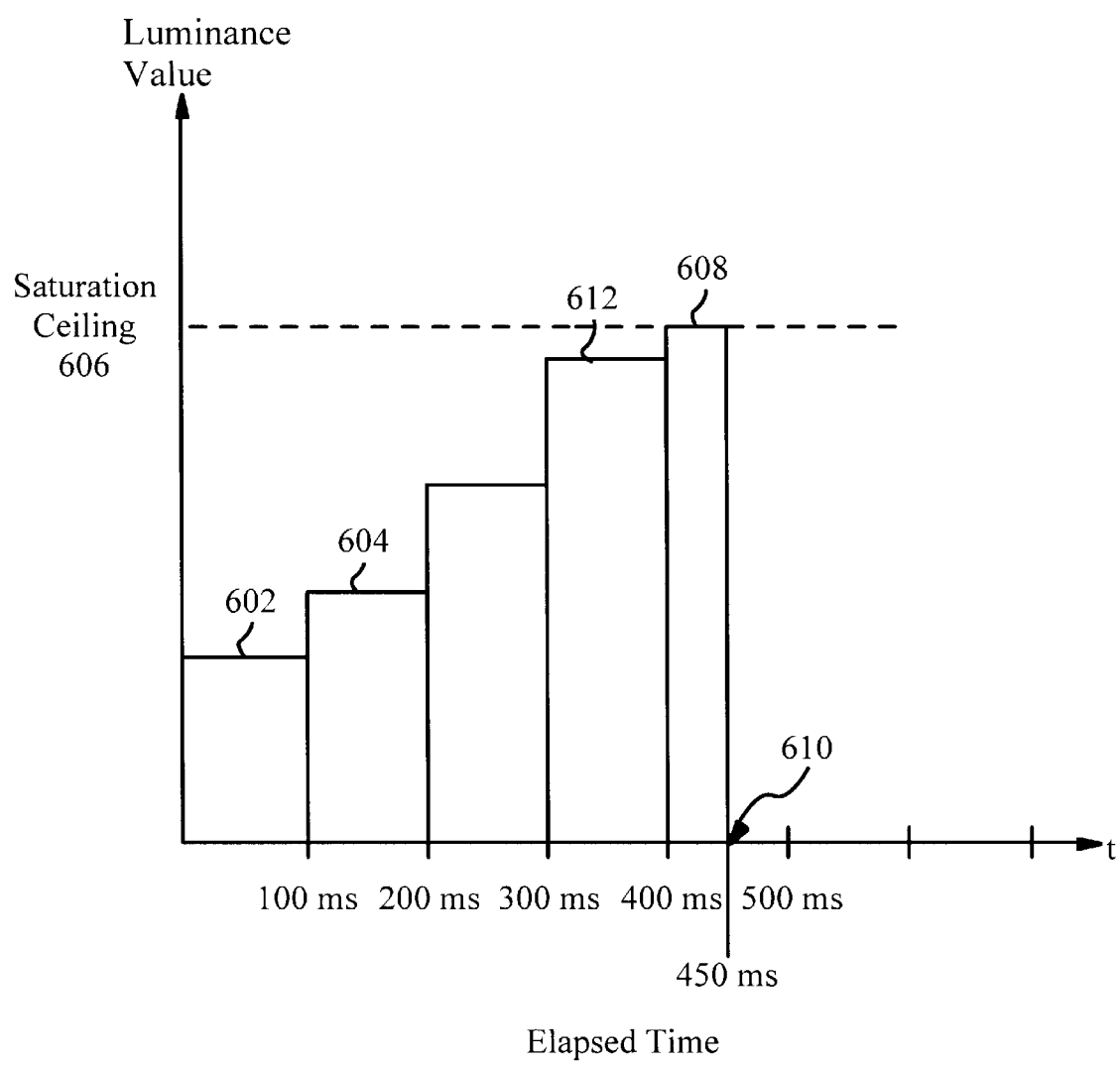
FIG. 6 is a graph illustrating the time interval exposure of the present invention.

FIG. 6 illustrates the idea of time interval sampling in the present invention. FIG. 6 is a graphical illustration of the exposure status of an exemplary photodetector. The monitoring unit 112 may be preset to sample the photodetector every 100 ms from the beginning of the exposure period. The luminance value after 100 ms have elapsed from the beginning of the exposure period is illustrated by 602 and after 200 ms is illustrated by 604. At 400 ms, the photodetector is close to the saturation ceiling 606 as illustrated by 612. If the monitoring unit 112 performs the next sampling at the preset time of 500 ms, the saturation level of the photodetector may already be significantly past the saturation ceiling 606. Therefore, the monitoring unit 112 is instructed by the exposure controller 120 to do the next sampling at 450 ms, or 50 ms from the last sampling, for example. The saturation level of the photodetector at time 450 ms is at or slightly past the saturation ceiling 606 and the exposure controller will terminate the further recording of digital image signals from this photodetector, preserving the optimal digital image signal that was recorded at time 450 ms.

Figure 7:
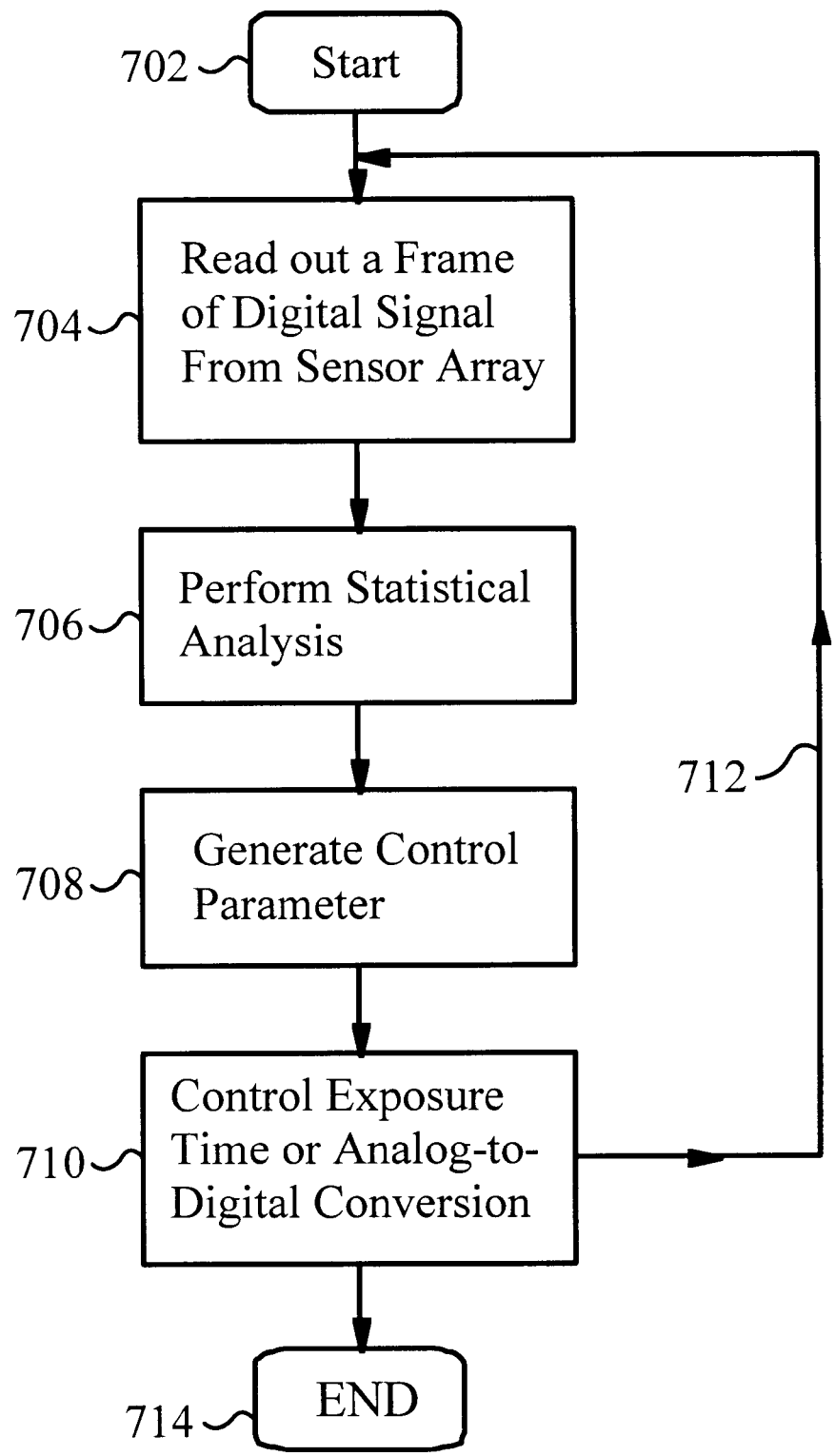
FIG. 7 is a flow diagram illustrating the method of the present invention.

FIG. 7 summarizes the method for optimizing image exposure in the present invention. Steps 702 and 714 signify start and stop, respectively, of the exposure of a particular pixel or a region of pixels. Step 704 represents the readout of the digital image signals from each individual photodetector in the image sensor array. This step also encompasses extracting a luminance value from each digital image signal, representative of the saturation of each photodetector. In step 706, a statistical analysis is performed on the luminance values extracted from each of the photodetectors. This statistical analysis is done to determine if a photodetector, or a region of photodetectors, has reached a preset saturation ceiling. A control parameter is generated in step 708 to control the exposure time for a particular photodetector or a region of photodetectors. This value of the control parameter is dependent on whether the photodetector or a region of photodetectors has reached the saturation ceiling. At step 710, the photodetector or a region of photodetectors may be further exposed, in which case path 712 will be followed and the read out and analysis continues. If a photodetector has reached the saturation ceiling, the image signals from this photodetector or region of photodetectors will no longer be recorded and the process will end 714. The control parameter 708 can be used for other purposes such as controlling the analog-to-digital conversion circuitry as illustrated below.

Figure 3:
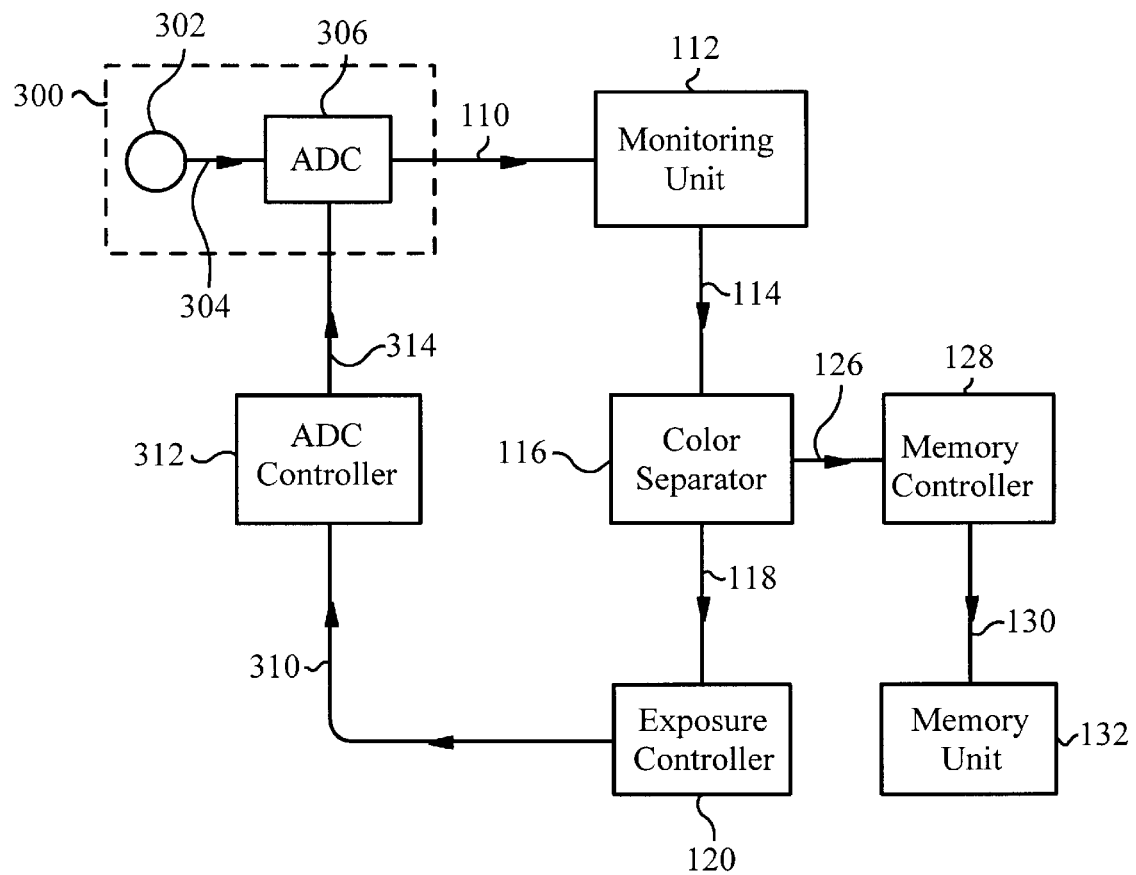
FIG. 3 is a block diagram illustrating a third embodiment of the present invention.

FIG. 3 shows an alternative use of the exposure controller signal 122 of the present invention. A pixel 300 comprises a photodetector 302 and an 8-bit analog-to-digital converter 306. As in the previous two embodiments, the digital output 110 of the pixel is fed into a monitoring unit 112, then through a color separator 116 and finally into the exposure controller 120. The exposure controller 120 analyzes the luminance value of the photodetector and controls the ADC controller 312 via signal 310 to affect the behavior of the analog-to-digital converter 306.

Figure 4:
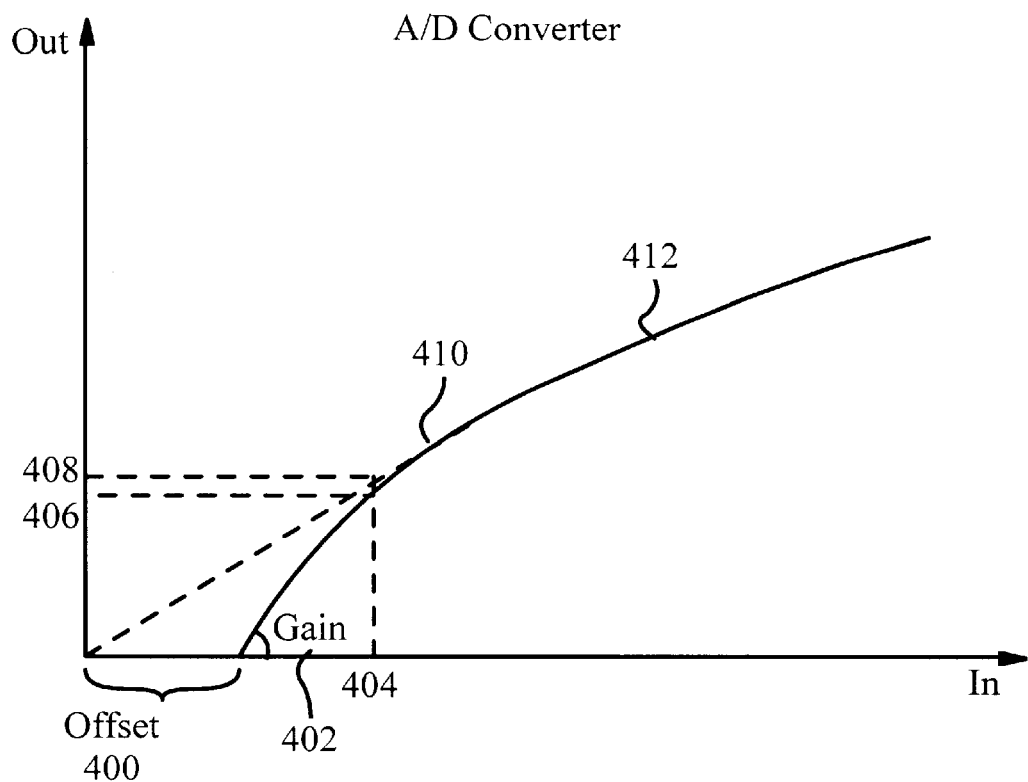
FIG. 4 is a graph showing the A/D Converter input and output relationship in the present invention.

FIG. 4 shows a plot of the analog input signal versus the digital output signal of the analog-to-digital converter 306. Under normal conditions, the analog input signal and the digital output signal have a relationship characterized by curve 410. Assuming that the gain 402 is at a 45 degree angle, one unit of analog input signal 404 will result in one unit of digital output unit 408. However, the ADC controller 312 can control an offset 400 causing a curve that looks like curve 412. By offsetting the curve like 412, for the same analog input signal 404, a lower digital output signal 406 can be achieved. By controlling the ADC controller 312 and thus the offset 400, the exposure controller can effectively prevent the pixel from outputting a saturated digital image signal.

It will be clear to one skilled in the art that the above embodiment may be altered in many ways without departing from the scope of the invention. Accordingly, the scope of the invention should be determined by the following claims and their legal equivalents.

What is claimed is:

1. A method for optimizing an exposure time of an image sensor during an exposure of a target, the method comprising:
    a) obtaining a number of digital image signals from a corresponding number of pixels from said image sensor;
    b) performing statistical analysis on luminance values derived from said number of digital image signals;
    c) deriving one or more control parameters from the statistical analysis; and
    d) using said one or more control parameters to alter the exposure time for said pixels in said image sensor during said exposure of a target;
    wherein said exposure time comprises a number of preset time intervals and wherein said obtaining of a number of digital signals is accomplished by repeatedly sampling said number of digital signals at an end of one of said preset time intervals; and
    wherein said using said control parameter to alter the exposure time comprises causing a last one of said preset time intervals to be reduced to avoid some of said digital signals reaching saturation.

2. The method as claimed in claim 1 wherein each of said pixels includes a photodetector and a circuit, said photodetector producing an analog signal when exposed to said target and said circuit converting said analog signal to one of said digital image signals.

3. The method as claimed in claim 2 wherein said photodetector in each of said pixels is fabricated on complementary metal-oxide semiconductor (CMOS).

4. The method as claimed in claim 1 wherein said statistical analysis is performed by a digital signal processor.

5. The method as claimed in claim 1 wherein said one or more control parameters is indicative of whether a pixel has reached a saturation ceiling.

6. The method as claimed in claim 1 wherein said statistical analysis is a peak value statistical analysis.

7. The method as claimed in claim 1 wherein said statistical analysis is an average value statistical analysis.

8. The method as claimed in claim 1 wherein said statistical analysis is a histogram distribution statistical analysis.

9. The method as claimed in claim 1 wherein the exposure time is altered by selectively terminating recording of digital signals from each of said number of pixels or from a region of pixels based on said one or more control parameters derived from said statistical analysis.

10. An image sensor system with an optimized exposure time having an image sensor comprising:

an array of pixel elements, each of said pixel elements having a saturation ceiling, said pixel elements producing digital signals when being exposed to a target;

a monitoring unit for sampling the digital signals at each of preset time intervals, wherein an exposure time includes a number of said preset time intervals; and a control circuit in communication with said monitoring unit for terminating a recording of said digital signals from said pixel elements during an exposure in response to one or more control parameters derived by a statistical analysis from the sampled digital signals from said pixel elements, wherein each of said pixel elements includes a photodetector and an analog-to-digital circuit, said photodetector generating an analog signal when being exposed to a target, said analog-to-digital circuit converting said analog signal to said digital signal;

wherein said control circuit causes a last one of said preset time intervals to be reduced to avoid some of said photodetectors from being saturated based on said one or more control parameters.

11. The system as claimed in claim 10 wherein said photodetectors are based on complementary metal-oxide semiconductor (CMOS).

12. The system as claimed in claim 10 wherein said digital signal is written into a memory unit.

13. The system as claimed in claim 10 wherein said pixel elements are grouped into regions, each region having a regional saturation level and a regional saturation ceiling.

14. The system as claimed in claim 13 wherein each of said regions generates said one or more control parameters.

15. The system as claimed in claim 13 wherein said pixel elements are sampled at each of said preset time intervals during said exposure time to determine each of said photodetector's saturation level.

16. The system as claimed in claim 13 wherein said termination of recording of said digital image signals can be performed on each of said photodetectors or for each of said regions of photodetectors.

17. The system as claimed in claim 13 wherein said controller generates said one or more control parameters based on said statistical analysis to determine if each of said regional saturation levels have reached each of said corresponding regional saturation ceilings.

18. The system as claimed in claim 17 wherein said statistical analysis is to determine a peak value within each of said regions.

19. The system as claimed in claim 17 wherein said statistical analysis is to determine an average value within each of said regions.

20. The system as claimed in claim 17 wherein said statistical analysis is to perform a histogram distribution statistical analysis.

* * * * *